United States Patent [19]

Schakel

[11] Patent Number: 5,927,422
[45] Date of Patent: Jul. 27, 1999

[54] METHOD AND APPARATUS FOR CORRECTING DRIVE WHEEL SLIP

[75] Inventor: Mark A. Schakel, Hendersonville, N.C.

[73] Assignee: Meritor Heavy Vehicle Systems, L L C, Troy, Mich.

[21] Appl. No.: 08/873,536

[22] Filed: Jun. 12, 1997

[51] Int. Cl.⁶ .................................................. B60K 28/16
[52] U.S. Cl. ............................ 180/197; 180/338; 701/88
[58] Field of Search ..................................... 180/197, 338; 701/82, 88

[56] References Cited

U.S. PATENT DOCUMENTS

| | | | |
|---|---|---|---|
| 4,361,871 | 11/1982 | Miller et al. | 180/197 |
| 4,671,373 | 6/1987 | Sigl | 180/197 |
| 4,886,140 | 12/1989 | Leiber et al. | |
| 4,947,954 | 8/1990 | Fujita et al. | |
| 4,953,654 | 9/1990 | Imaseki et al. | |
| 4,979,931 | 12/1990 | Fleischmann et al. | 180/338 |
| 4,989,685 | 2/1991 | Matsuda | |
| 5,130,928 | 7/1992 | Petersen | |
| 5,505,267 | 4/1996 | Orbach et al. | |
| 5,574,643 | 11/1996 | Yesel | 701/82 |
| 5,676,219 | 10/1997 | Fruhwirth et al. | 180/197 |

*Primary Examiner*—Kevin Hurley

[57] ABSTRACT

A system for correcting drive wheel slippage in a heavy vehicle includes a front non-drive axle and either a single or tandem rear drive axle with an inter-axle differential with locking capability. Each drive axle also includes a main differential with locking capability. The system further includes a first sensor for measuring the rotational speed of the driveshaft and a second sensor for measuring non-driven wheel speed. A central processor compares the driveshaft speed to the non-driven wheel speed and locks the inter-axle differential of a tandem rear drive axle to drive the front and rear drive axles at the same speed or locks the main differential of a single rear drive axle to drive the first and second driven wheels at the same speed when the ratio of the driveshaft speed signal to the first non-driven wheel speed signal exceeds the predetermined limit. In the tandem configuration, if drive wheel slippage continues, the main differentials of the front and rear drive axles are also locked.

20 Claims, 3 Drawing Sheets

METHOD AND APPARATUS FOR CORRECTING DRIVE WHEEL SLIP

BACKGROUND OF THE INVENTION

This invention relates to a unique method and apparatus for correcting drive wheel slippage in a vehicle.

A typical configuration for a heavy vehicle includes a front non-drive axle with two non-driven wheels and either a single or tandem rear drive axle. A single rear drive axle includes first and second driven wheels which are rotated by a driveshaft through a main differential. A tandem rear drive axle includes a front drive axle with a first pair of driven wheels and a rear drive axle with a second pair of driven wheels. The front and rear drive axles are interconnected by an inter-axle differential which transfers rotation and torque from the front drive axle's main differential to the rear drive axle's main differential. Under poor traction conditions, such as mud or ice, all of the driving power or torque may be transferred to a single driven wheel. When this single driven wheel is on a slippery surface, the wheel will spin in one place while all of the remaining driven wheels are motionless. This condition is known as wheel slip and is undesirable because it prevents the vehicle from moving in a forward or reverse direction.

To avoid wheel slip, the main differentials include a locking mode which locks the driven wheels together, forcing them to be driven at the same speed and thus preventing all of the driving power from being transferred to any one wheel. In a tandem configuration, the inter-axle differential also includes a locking mode which locks the front and rear drive axles together, forcing them to be driven at the same speed. When using differentials with locking modes, it is important to set certain conditions under which the differentials should be locked. Some systems require the driver to control when the differentials are locked while other systems are electronically controlled.

Current systems for correcting drive wheel slippage include sensors located at each driven wheel for measuring the driven wheel speeds. A central processor monitors driven wheel speeds to determine if there is drive wheel slip. Once slip is detected either the inter-axle differential, main differentials, or some combination thereof are locked. Additional sensors may be located at the non-driven wheels to measure the non-driven wheel speeds. When non-driven wheel sensors are used, the central processor monitors both the measured driven and non-driven wheel speeds to determine if there is drive wheel slippage. Thus, in order for current systems to be operable, at least all driven wheels are monitored with an associated speed sensor.

It would be desirable to reduce the number of sensors on the driven wheels. Current systems which require sensors located at each of four driven wheels to determine if there is slippage are undesirably complex. Thus, there is a need for a system for correcting drive wheel slippage which does not need any input from driven wheel sensors. Also, the system must be easily adapted to current systems and must have the flexibility to be used on any and all vehicle configurations.

SUMMARY OF THE INVENTION

The subject invention relates to a method for correcting drive wheel slippage in a vehicle having a pair of non-driven wheels and first and second driven wheels rotated by a driveshaft. A first differential has a normal drive mode for driving the driven wheels and a locking mode for positively driving both of the driven wheels. The method comprises the steps of measuring the rotational speed of the driveshaft to produce a driveshaft speed signal. Also the rotational speed of at least one non-driven wheel is measured to produce a first non-driven wheel speed signal. The method compares the driveshaft speed signal to the non-driven wheel speed signal, and locks the first differential in the locked mode to positively drive both of the driven wheels when the ratio of the driveshaft speed signal to the first non-driven wheel speed signal exceeds a predetermined limit. More preferably, the speed of both non-driven wheels are measured.

An apparatus to carry out the invention includes a first sensor for measuring the rotational speed of the driveshaft to produce a driveshaft speed signal, a second sensor for measuring the rotational speed of the first non-driven wheel to produce a first non-driven wheel speed signal, and a processor for comparing the driveshaft speed signal to the non-driven wheel speed signal and for locking the first differential in the locked mode to positively drive the first and second driven wheels when the ratio of the driveshaft speed signal to said first non-driven wheel speed signal exceeds a predetermined limit.

The subject invention offers several advantages over prior art systems because it has the flexibility to be utilized with any vehicle design. The invention also eliminates the need for driven wheel speed sensors and offers a simple and effective way to correct drive wheel slippage.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2B is a schematic view of the system as shown in FIG. 2A; and

DETAILED DESCRIPTION OF A PREFERRED EMBODIMENT

Figure 1A:
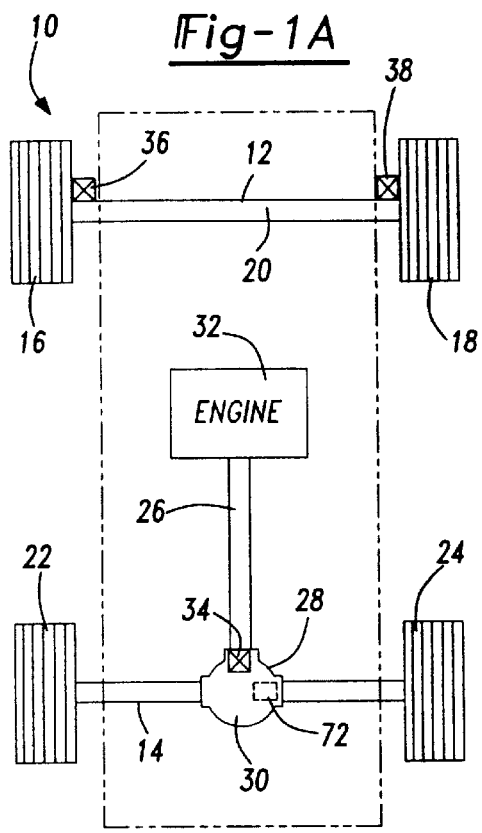
FIG. 1A is an overhead view of a powertrain system utilizing the method and apparatus of the instant invention for correcting drive wheel slip.

FIG. 1A shows a basic powertrain 10 for a heavy vehicle. Powertrain 10 includes a front non-drive axle 12 and a single rear drive axle 14. The front non-drive axle 12 includes first 16 and second 18 non-driven wheels interconnected by an axle beam 20. The rear drive axle 14 includes first 22 and second 24 driven wheels rotated by a driveshaft 26 through a first differential 28 acting as a main differential 30. The driveshaft 26 transmits torque and rotation from an engine 32 to the main differential 30. The main differential 30 has two modes, a normal drive mode for driving the driven wheels 22, 24 during normal vehicle operation and a locking mode for positively driving both of the driven wheels 22, 24 during poor traction conditions. The means for locking may be as known in the art.

During the normal driving mode, the differential 30 allows differentiation in speed between the first 22 and second 24 driven wheels, i.e., the first 22 and second 24 driven wheels can be at different speeds to accommodate vehicle turning maneuvers. Thus, the rotational speed of the main driving member, driveshaft 26, is equal to the algebraic mean of the speeds of the two driven wheels. However, when the main differential 30 is in the locked mode, the first 22 and second 24 driven wheels are "locked" together, meaning the driven wheels 22, 24 are required to rotate at the same speed, i.e., there is no speed differentiation in the locked mode.

Figure 1B:
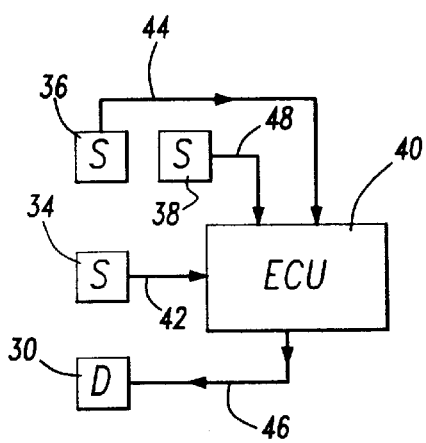
FIG. 1B is a schematic view of the system as shown in FIG. 1A.
Figure 2A:
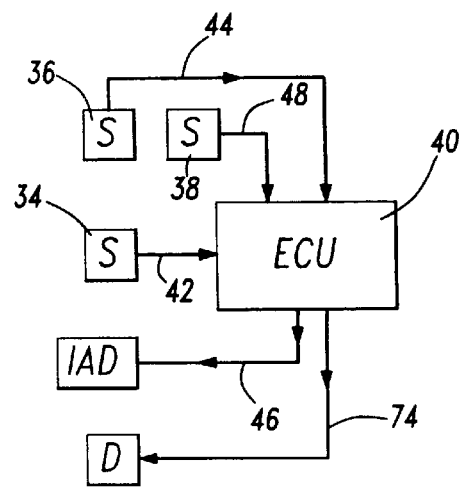

A first sensor 34 measures the rotational speed of the driveshaft 26, a second sensor 36 measures the wheel speed of the first non-driven wheel 16, and a third sensor 38 measures the wheel speed of the second non-driven wheel 18. As shown in FIG. 1B, all three sensors are electrically connected to an electronic control unit (ECU) 40 or central processor by means well known in the art. The central processor 40 receives all of the input data from the three sensors 34, 36, and 38, processes the information, and determines if there is drive wheel slippage to be corrected by locking the main differential 30.

Figure 1C:
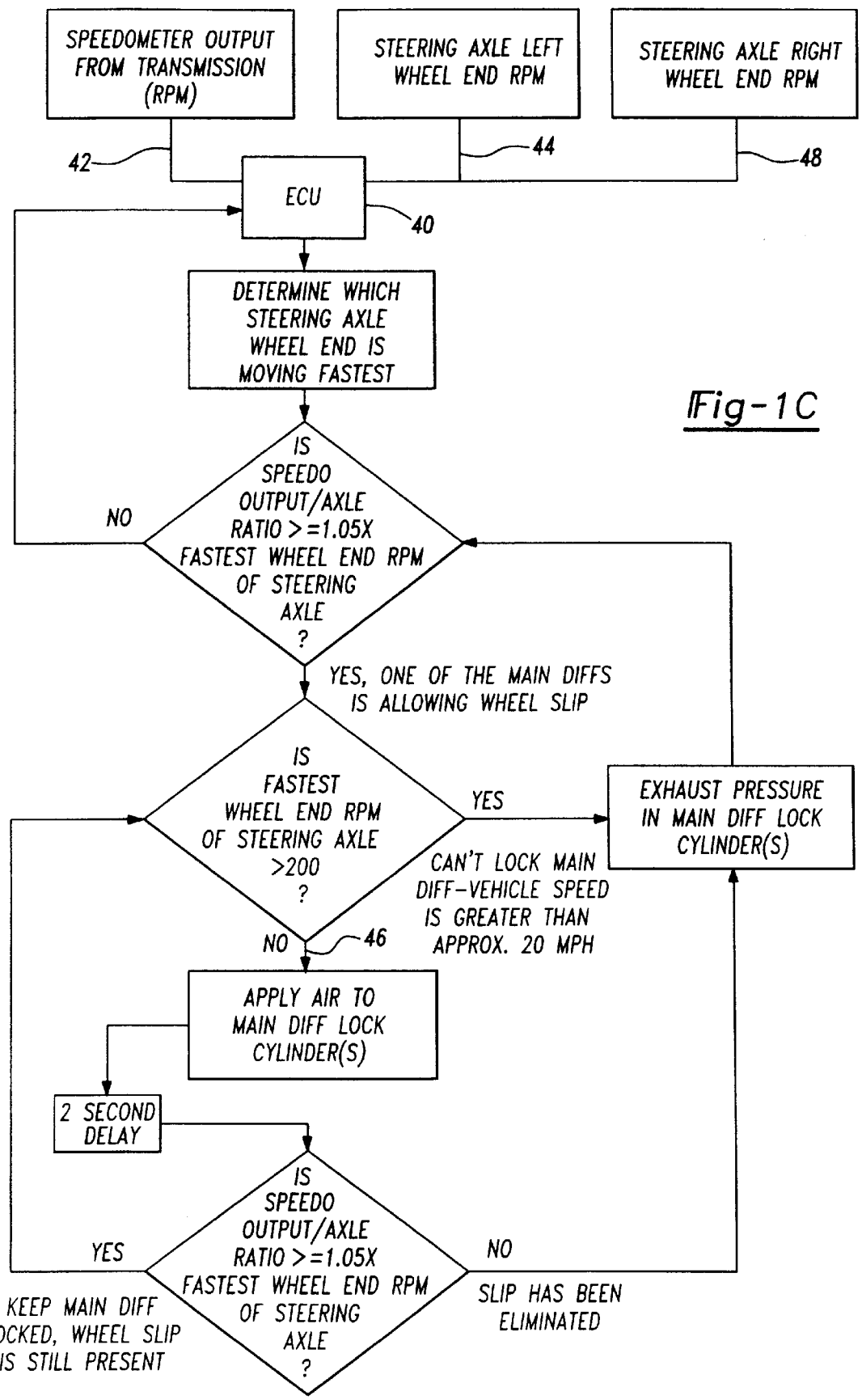
FIG. 1C is a flow chart of a method according to this invention.

The method of determining whether or not to lock the main differential 30 involves the following steps as shown in FIG. 1C. First, the rotational speed of the driveshaft 26 is measured via the first sensor 34, producing a driveshaft speed signal 42. In the preferred embodiment, the first sensor 34 measures the speedometer output from the transmission (not shown) to obtain the rotational speed of the driveshaft 26, however, it is understood that the first sensor 34 can measure this rotational speed at any point along the driveshaft 26. Additionally, the rotational speed of either the first 16 or second 18 non-driven wheel speed is measured via the second 36 or third 38 sensors respectively, producing a first non-driven wheel speed signal 44. Finally, the driveshaft speed signal 42 is compared to the non-driven wheel speed signal 44 and the main differential 30 is locked when the ratio of the driveshaft speed signal 42 to the first non-driven wheel speed signal 44 exceeds a predetermined limit. When the central processor 40 determines that the main differential 30 is to be placed in the locked mode it results in a first locking signal 46 which causes both of the driven wheels 22, 24 to be positively driven.

More specifically, while the second sensor 36 measures the speed of the first non-driven wheel 16, the third sensor 38 measures the speed of the second non-driven wheel 18 and produces a second non-driven wheel speed signal 48. The first 44 and second 48 non-driven wheel speed signals are compared to each other to determine which non-driven wheel 16, 18 is moving fastest. It is the fastest non-driven wheel speed signal 44 or 48 that is compared to the driveshaft speed signal 42. Only one non-driven wheel sensor is necessary for determining whether there is drive wheel slippage, however, in the preferred embodiment both non-driven wheels 16, 18 have sensors 36, 38.

The central processor 40 is programmed to divide the measured rotational driveshaft speed signal 44, 48 by the axle ratio of the rear drive axle 14 to produce a theoretical drive wheel speed signal. The axle ratio is a fixed system parameter, representing the ratio of the speed in revolutions per minute (rpm) of the drive shaft 26 to that of the driven wheels 22, 24. Dividing the driveshaft speed signal 42 by the axle ratio provides a calculated theoretical driven wheel speed without having to actually use sensors to measure the driven wheel speeds. The axle ratio can be any of various numbers but is usually within the range of two (2) to ten (10). Thus, an axle ratio of two (2) would represent a two to one (2:1) reduction in speed from the driveshaft speed to the driven wheel speed. For example, if the measured drive shaft speed is 500 rpm and the axle ratio is two (2), the theoretical driven wheel speed, i.e., the driveshaft speed divided by the axle ratio, would be 250 rpm assuming that both driven wheels 22, 24 are driven at the same speed. While an axle ratio ranging from two (2) to ten (10) represents the majority of vehicles, it is understood that the axle ratio could be less than two (2) or greater than ten (10).

Once the central processor 40 has calculated the theoretical driven wheel speed, the fastest non-driven wheel speed signal 44, 48 is compared to the theoretical driven wheel speed. If the non-driven wheel speed signal 44, 48 is less than the theoretical driven wheel speed, rear drive wheel slip is detected. Thus, slip is detected without actually having to measure the speed of either driven wheel 22, 24. With the system of the subject invention it is not known which driven wheel 22, 24 is slipping and it is not relevant to know this. The only important fact to know is that there is slip. Once rear drive wheel slip is detected the main differential 30 is locked, resulting in the first 22 and second 24 driven wheels being positively driven at approximately equal speeds.

However, the main differential 30 will not be placed in the locked mode if the fastest measured non-driven wheel speed signal 44, 48 exceeds twenty miles per hour. Locking the differential 30 at speeds greater than twenty miles per hour can affect the steering characteristics of the vehicle. While twenty miles per hour is the preferred maximum allowable speed for locking the main differential 30, it is understood that speeds greater or less than twenty miles per hour can be used as a maximum limit.

Also, in order to prevent unnecessary locking of the main differential 30 under good traction conditions in situations where the non-driven wheels 16, 18 would necessarily be traveling at slower speeds than the driven wheels 22, 24, such as when the non-driven wheels 16, 18 and the driven wheels 22, 24 have different loaded radii, the fastest non-driven wheel speed signal 44, 48 is multiplied by a constant of 1.05. Thus, drive wheel slip is detected if the quantity of fastest non-driven wheel speed signal 44, 48 multiplied by the constant 1.05 is less than or equal to the theoretical driven wheel speed. A constant of 1.05 is the preferred factor, however, the constant can be less than or greater than 1.05. When the non-driven wheel speed signal 44, 48 is multiplied by a constant such as 1.05, the front non-driven wheels 16, 18 are considered to be at a slightly greater than measured speed, preventing the main differential 30 from unnecessarily locking when the loaded radius of the non-driven wheels is larger than the loaded radius of the driven wheels 22, 24. Situations which would cause variation in the loaded radii of the driven 22, 24 and non-driven 16, 18 wheels are tire treadwear, varying inflation pressures, and a heavier load on either the driven wheels 22, 24 or the non-driven wheels 16, 18.

Once the locking signal 46 has been sent by the central processor 40, there is a delay of approximately two (2) seconds to allow the differential 30 to shift from the normal mode to the locked mode. After the two (2) second delay the central processor 40 again compares the fastest non-driven wheel speed signal 44, 48 to the theoretical driven wheel speed. If the quantity of fastest non-driven wheel speed signal 44, 48 multiplied by the constant 1.05 is greater than the theoretical driven wheel speed then drive wheel slip has been eliminated and the main differential 30 is unlocked and returned to the normal driving mode. If the quantity of fastest non-driven wheel speed signal 44, 48 multiplied by the constant 1.05 is still less than or equal to the theoretical driven wheel speed, one of the driven wheels 22, 24 is slipping. If the speed of the non-driven wheels 16, 18 is still less than twenty miles per hour then the main differential 30 will remain locked for another two (2) second period. The central processor 40 then repeatedly runs the comparison over and again every two (2) seconds until the drive wheel slip has been eliminated. The two (2) second delay is the preferred amount of time to allow the shift from the normal mode to the locked mode to take place, however, a period of time greater or less than two (2) seconds can be used.

Figure 2A:
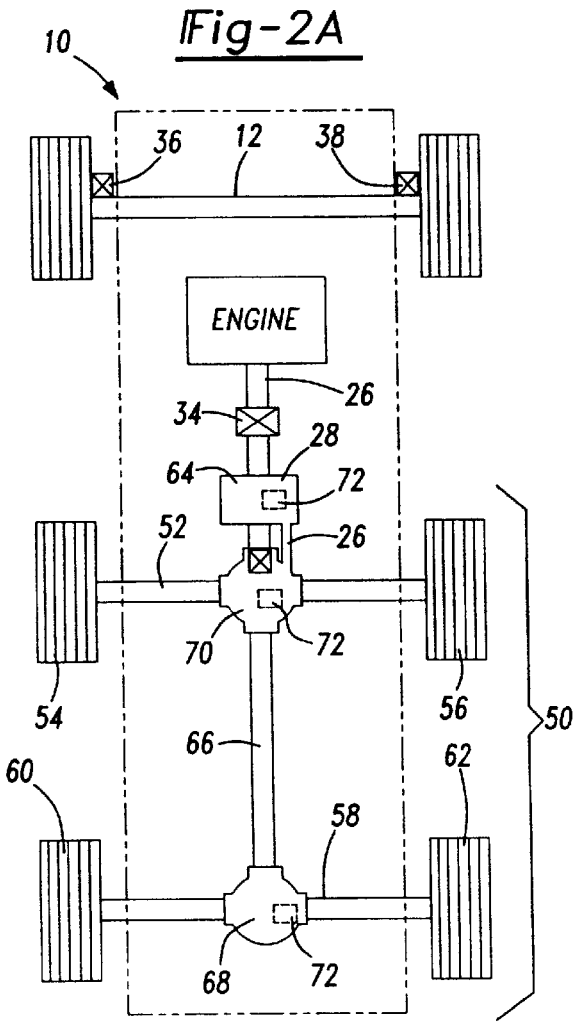
FIG. 2A is a figure similar to FIG. 1A but showing an alternate embodiment of powertrain system.

FIG. 2A shows another powertrain embodiment 10 for a heavy vehicle. This embodiment includes a front non-drive axle 12 and a rear tandem axle 50. The tandem axle 50 includes a front drive axle 52 with first 54 and second 56 driven wheels and a rear drive axle 58 with third 60 and fourth 62 driven wheels. The front 52 and rear 54 drive axles are interconnected by a first differential 28 acting as an inter-axle differential (IAD) 64 with a normal drive mode for driving the rear drive axle 58 during normal vehicle operation and a locking mode for positively driving both the front 52 and rear 58 drive axles at the same speed during poor traction conditions.

The first 54 and second 56 driven wheels of the front drive axle 52 are rotated by the driveshaft 26 through a first main differential 70 in a manner similar to the main differential 30 in the single rear drive axle 14 shown in FIG. 1. The third 60 and fourth 62 driven wheels of the rear drive axle 58 are rotated by a thru-shaft 66 by way of a second main differential 68. The first 70 and second 68 main differentials are of similar design and have two modes, a normal drive mode for driving their respective driven wheels 54, 56 and 60, 62 during normal vehicle operation and a locking mode for positively driving both of their respective driven wheels 54, 56 and 60, 62 during poor traction conditions. It is understood that it is not necessary for both main differentials 70, 68 to have a locking mode. In a typical configuration only the second main differential 68 in the rear drive axle 14 will have locking capability but just the first main differential 70 in the front drive axle 52 or both main differentials 70, 68 can have locking capability.

The first 34, second 36, and third 38 sensors perform the same functions in the tandem axle 50 configuration as they do for the single drive axle 14 configuration shown in FIG. 1A. As shown in FIG. 2B and in a similar manner as with the single drive axle 14 configuration, each sensor 34, 36, 38 is electrically connected to an electronic control unit (ECU) 40 or central processor by means well known in the art. However, in the tandem axle 50 configuration, the central processor 40 receives all of the input data from the three sensors 34, 36, and 38, processes the information, and first determines whether or not the inter-axle differential 64 should be locked and then once the inter-axle differential 64 is locked, determines whether or not the main differentials 70, 68 should be locked.

Figure 2C:
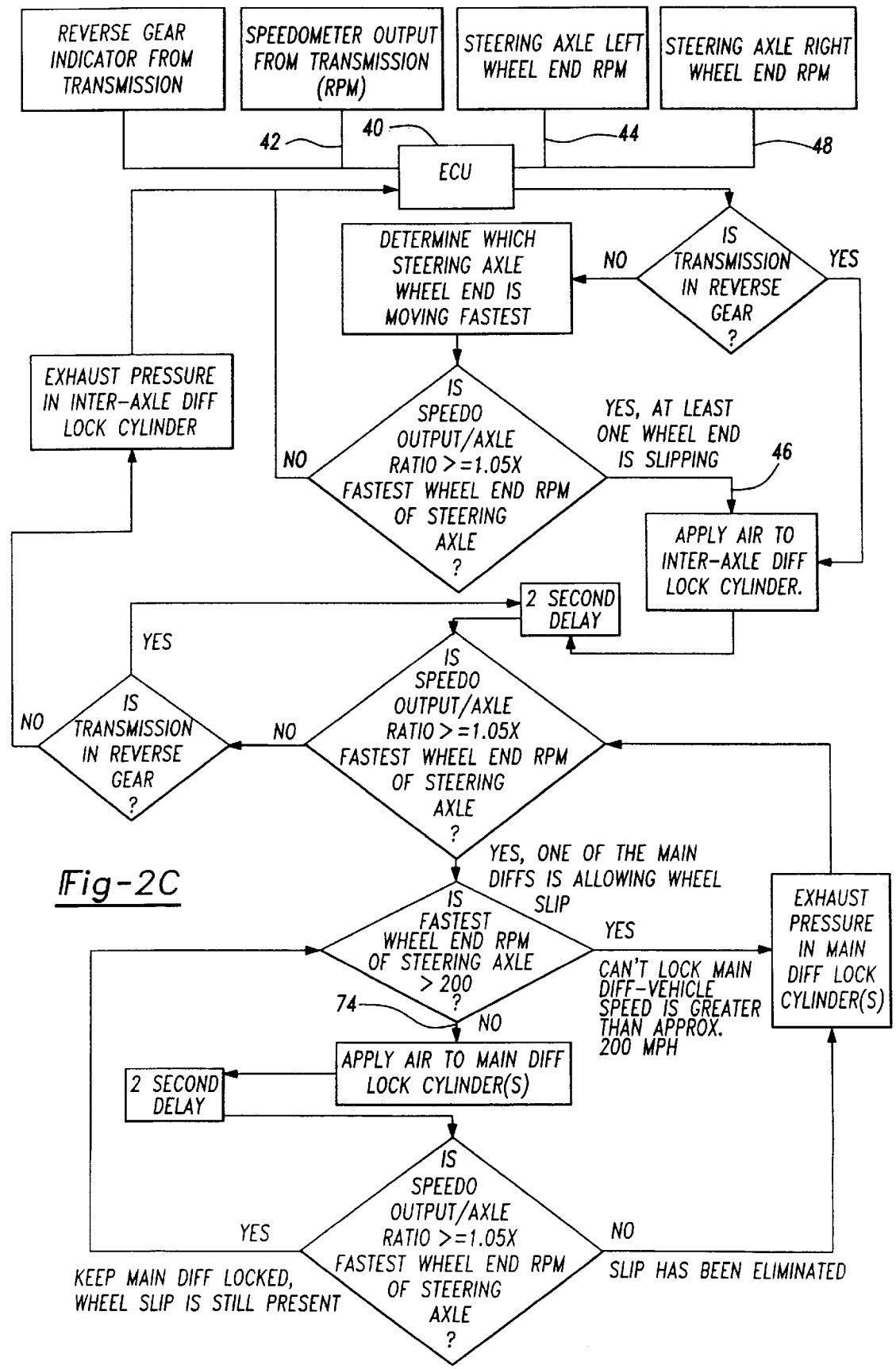
FIG. 2C is a flow chart of a method according to this invention.

In a method similar to that used with a single rear drive axle 14, the method used with the tandem axle 50, shown in FIG. 2C, involves comparing the fastest non-driven wheel speed signal 44, 48 to the theoretical driven wheel speed. If the quantity of the fastest non-driven wheel speed signal 44, 48 multiplied by the constant 1.05 is less than or equal to the theoretical driven wheel speed, rear drive wheel slip is detected. Once drive wheel slip is detected and the central processor 40 determines that the inter-axle differential 64 is to be placed in the locked mode, a first locking signal 46 locks the inter-axle differential causing the front 52 and rear 58 drive axles to be driven at the same speed. Once the locking signal 46 has been sent by the central processor 40, there is a delay of approximately two (2) seconds to allow the inter-axle differential 64 to shift from the normal mode to the locked mode. After the two (2) second delay the central processor 40 again compares the fastest non-driven wheel speed signal 44, 48 to the theoretical driven wheel speed. If the quantity of fastest non-driven wheel speed signal 44, 48 multiplied by the constant 1.05 is greater than the theoretical driven wheel speed then drive wheel slip has been eliminated and the inter-axle differential 64 is unlocked and returned to the normal driving mode. If the quantity of fastest non-driven wheel speed signal 44, 48 multiplied by the constant 1.05 is still less than or equal to the theoretical driven wheel speed, at least one of the driven wheels 54, 56, 60 or 62 is slipping.

If the speed of the non-driven wheels 16, 18 is still less than twenty miles per hour then a second locking signal 74 will lock the main differentials 70, 68 in both the front 52 and rear 58 drive axles respectively, causing all of the driven wheels 54, 56, 60 and 62 to be driven at the same speed. If the rear drive axle 58 is the only axle with a locking mode then only the rear pair of driven wheels 60, 62 will be driven at the same speed.

Once the locking signal 74 has been sent by the central processor 40, there is a delay of approximately two (2) seconds to allow the differentials 70, 68 to shift from the normal mode to the locked mode. After the two (2) second delay the central processor 40 again compares the fastest non-driven wheel speed signal 44, 48 to the theoretical driven wheel speed. If the quantity of fastest non-driven wheel speed signal 44, 48 multiplied by the constant 1.05 is greater than the theoretical driven wheel speed then a determination is made that drive wheel slip has been eliminated. The main differentials 70, 68 are then unlocked and returned to the normal driving mode. The central processor 40 again compares the fasted non-driven wheel speed signal 44, 48 to the theoretical driven wheel speed and if the non-driven wheel speed signal 44, 48 is greater than the theoretical driven wheel speed the inter-axle differential 64 is also unlocked and returned to the normal driving mode.

If, however, the quantity of fastest non-driven wheel speed signal 44, 48 multiplied by the constant 1.05 is still less than or equal to the theoretical driven wheel speed, a determination is made that one of the driven wheels 54, 56, 60 or 62 is slipping. If the speed of the non-driven wheels 16, 18 is still less than twenty miles per hour then the main differentials 70, 68 will remain locked for another two (2) second period. The central processor 40 then repeatedly runs the comparison over periods of two (2) seconds until the slip has been eliminated.

As with the method used with the single drive axle 14 configuration, the 1.05 constant and the two (2) second delay are only preferred factors. A constant greater to or less than 1.05 could be used and that a delay greater to or less than two (2) seconds can be used.

It should be noted that when the vehicle transmission (not shown) is in reverse gear in a tandem drive axle 50 configuration, the inter-axle differential 64 will always be in the locked mode. So whenever the central processor 40 compares the fastest non-driven wheel speed signal 44, 48 to the theoretical driven wheel speed it will always first determine whether or not the transmission is in reverse gear. If the transmission is in reverse gear the inter-axle differential 64 will remain locked even though drive wheel slippage has been eliminated. Once the transmission is shifted from a reverse gear to a forward gear then the inter-axle differential 64 will be unlocked, assuming there is no drive wheel slippage.

Also, it should be noted that the locking modes for the inter-axle differential 64 and the main differentials 30, 68, 70 are accomplished with lock mechanisms 72 well known in the art and which can be actuated pneumatically, hydraulically, or electro-mechanically.

A preferred embodiment of this invention has been disclosed, however, a worker of ordinary skill in the art would recognize that certain modifications come within the scope of this invention. For that reason, the following claims should be studied to determine the true scope and content of this invention.

We claim:

1. A method for correcting drive wheel slippage in a vehicle comprising the steps of:

1) providing a pair of non-driven wheels and at least first and second driven wheels rotated by a driveshaft and having a first differential having a normal drive mode for driving the driven wheels and a locking mode for positively driving both of the driven wheels;

2) measuring the rotational speed of the driveshaft to produce a driveshaft speed signal;

3) measuring the rotational speed of at least a first non-driven wheel to produce a first non-driven wheel speed signal;

4) comparing the driveshaft speed signal to the non-driven wheel speed signal; and 5) locking the first differential in the locked mode to positively drive both of the driven wheels when the ratio of the driveshaft speed signal to the first non-driven wheel speed signal exceeds a predetermined limit.

2. A method as set forth in claim 1 further including the step of processing the driveshaft speed signal through a formula to produce a drive wheel speed signal representative of the speed of rotation of a drive wheel.

3. A method as set forth in claim 1 further including the step of measuring the rotational speed of a second non-driven wheel to produce a second non-driven wheel speed signal, and comparing the driveshaft speed signal to the one of the first and second non-driven wheel speed signals which represents the greatest wheel speed.

4. A method as set forth in claim 1 further including the step of unlocking the first differential to the normal drive mode in response to the ratio falling below the predetermined limit.

5. A method as set forth in claim 1 further including the step of providing only said first and second driven wheels on a single drive axle rotated by the driveshaft through the first differential, wherein locking the first differential in the locked mode is further defined as locking the first and second driven wheels together for driving the driven wheels at the same speed.

6. A method as set forth in claim 1 further including the step of providing the first driven wheel in a front drive axle of a tandem axle having front and rear drive axles and providing the second driven wheel in the rear drive axle and interconnecting the front and rear axles with the first differential acting as an inter-axle differential, wherein the locking of the first differential in the locked mode is further defined as locking the inter-axle differential in the locked mode for positively driving the front and rear axles at the same speed.

7. A method as set forth in claim 6 further including the step of providing a second differential in the front drive axle extending between first and third driven wheels and rotated by the driveshaft through the second differential which has a normal drive mode and a locking mode for positively driving the first and third driven wheels, the locking step further defined as locking the second differential in the locked mode to positively drive the first and third driven wheels at the same speed when the ratio of the driveshaft speed signal to the first non-driven wheel speed signal exceeds the predetermined limit.

8. A method as set forth in claim 6 further including the step of providing a third differential in the rear drive axle extending between second and fourth driven wheels rotated by the driveshaft through the third differential which has a normal drive mode and a locking mode for positively driving the second and fourth driven wheels, the locking step further defined as locking the third differential in the locked mode to positively drive the second and fourth driven wheels at the same speed when the ratio of the driveshaft speed signal to the first non-driven wheel speed signal exceeds the predetermined limit.

9. A method as set forth in claim 6 further including the step of providing a second differential in the front drive axle extending between said first and third driven wheels and rotated by the driveshaft through the second differential which has a normal drive mode and a locking mode for positively driving said first and third driven wheels and including providing a third differential in the rear drive axle extending between said second and fourth driven wheels rotated by the driveshaft through the third differential which has a normal drive mode and a locking mode for positively driving said second and fourth driven wheels, the locking step further defined as locking said second and third differentials in the locked mode to positively drive all of the driven wheels at the same speed when the ratio of the driveshaft speed signal to the first non-driven wheel speed signal exceeds the predetermined limit.

10. An apparatus for correcting drive wheel slippage in a vehicle comprising:

first and second non-driven wheels;

first and second driven wheels rotated by a driveshaft;

a first differential having a normal drive mode for driving said driven wheels and a locking mode for positively driving both of said driven wheels;

a first sensor for measuring the rotational speed of said driveshaft to produce a driveshaft speed signal;

a second sensor for measuring the rotational speed of said first non-driven wheel to produce a first non-driven wheel speed signal; and a processor for comparing the driveshaft speed signal to the non-driven wheel speed signal and for locking said first differential in the locked mode to positively drive said first and second driven wheels when the ratio of said driveshaft speed signal to said first non-driven wheel speed signal exceeds a predetermined limit.

11. An apparatus as set forth in claim 10 including a third sensor for measuring the rotational speed of said second non-driven wheel to produce a second non-driven wheel signal, said processor including means for comparing the one of the first and second non-driven wheel signals which represents the greatest wheel speed to the driveshaft speed signal.

12. An apparatus as set forth in claim 10 wherein said processor includes means for placing the first differential in the normal drive mode in response to the ratio falling below the predetermined limit.

13. An apparatus as set forth in claim 10 wherein said first and second driven wheels are on a single drive axle rotated by said driveshaft through said first differential and whereby said processor locks said first and second driven wheels together for driving said driven wheels at the same speed.

14. An apparatus as set forth in claim 10 including a tandem axle having front and rear drive axles, said first driven wheel in said front drive axle and said second driven wheel in said rear drive axle, said front and rear drive axles interconnected by said first differential acting as an inter-axle differential whereby said processor locks said inter-axle differential in the locked mode for positively driving said front and rear drive axles at the same speed.

15. An apparatus as set forth in claim 14 wherein said front drive axle includes a third driven wheel and a second differential extending between said first driven wheel and said third driven wheel and rotated by said driveshaft through said second differential which has a normal drive mode and a locking mode for positively driving said first and third driven wheels, whereby said processor locks said second differential in the locked mode to positively drive said first and third driven wheels at the same speed when the ratio of the driveshaft speed signal to the first non-driven wheel speed signal exceeds the predetermined limit.

16. An apparatus as set forth in claim 14 wherein said rear drive axle includes a fourth driven wheel and a third differential extending between said second driven wheel and said fourth driven wheel and rotated by said driveshaft through said third differential which has a normal drive mode and a locking mode for positively driving said second and fourth driven wheels, whereby said processor locks said third differential in the locked mode to positively drive said second and fourth driven wheels at the same speed when the ratio of the driveshaft speed signal to the first non-driven wheel speed signal exceeds the predetermined limit.

17. An apparatus as set forth in claim 14 wherein said front drive axle includes a third driven wheel and a second differential extending between said first driven wheel and said third driven wheel and rotated by said driveshaft through said second differential which has a normal drive mode and a locking mode for positively driving said first and third driven wheels and said rear drive axle includes a fourth driven wheel and a third differential extending between said second driven wheel and said fourth driven wheel and rotated by said driveshaft through said third differential which has a normal drive mode and a locking mode for positively driving said second and fourth driven wheels, whereby said processor respectively locks said second and third differentials in the locked mode to positively drive all of said driven wheels at the same speed when the ratio of the driveshaft speed signal to the first non-driven wheel speed signal exceeds the predetermined limit.

18. An apparatus as set forth in claim 10 wherein said first differential includes a pneumatic lock mechanism controlled by said processor for locking said first differential in the locked mode.

19. An apparatus as set forth in claim 10 wherein said first differential includes a hydraulic lock mechanism controlled by said processor for locking said first differential in the locked mode.

20. An apparatus as set forth in claim 10 wherein said first differential includes a electro-mechanical lock mechanism controlled by said processor for locking said first differential in the locked mode.

* * * * *